(12) United States Patent
Karlow et al.

(10) Patent No.: US 7,669,882 B2
(45) Date of Patent: Mar. 2, 2010

(54) AIRBAG MODULE

(75) Inventors: James P. Karlow, Commerce Township, MI (US); Barney J. Bauer, Rochester, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 217 days.

(21) Appl. No.: 11/907,527

(22) Filed: Oct. 12, 2007

(65) Prior Publication Data

US 2008/0106075 A1    May 8, 2008

Related U.S. Application Data

(60) Provisional application No. 60/851,288, filed on Oct. 13, 2006.

(51) Int. Cl.
*B60R 21/16* (2006.01)
(52) U.S. Cl. .................................. 280/728.2
(58) Field of Classification Search ............. 280/728.2, 280/743.1, 743.2
See application file for complete search history.

(56) References Cited

U.S. PATENT DOCUMENTS

| | | | | | |
|---|---|---|---|---|---|
| 3,879,056 | A | * | 4/1975 | Kawashima et al. | 280/743.2 |
| 3,879,057 | A | * | 4/1975 | Kawashima et al. | 280/743.2 |
| 4,830,401 | A | * | 5/1989 | Honda | 280/736 |
| 5,497,023 | A | * | 3/1996 | Nakazato et al. | 257/394 |
| 5,558,365 | A | * | 9/1996 | Oe et al. | 280/731 |
| 5,562,301 | A | * | 10/1996 | Lutz | 280/728.2 |
| 5,607,183 | A | * | 3/1997 | Nishimura et al. | 280/743.2 |
| 5,727,812 | A | * | 3/1998 | Dykstra et al. | 280/731 |
| 5,765,867 | A | * | 6/1998 | French | 280/743.2 |
| 5,865,466 | A | * | 2/1999 | Yamamoto et al. | 280/743.1 |
| 6,070,904 | A | * | 6/2000 | Ozaki et al. | 280/743.1 |
| 6,139,048 | A | * | 10/2000 | Braunschadel | 280/728.1 |
| 6,955,377 | B2 | * | 10/2005 | Cooper et al. | 280/743.1 |
| 7,213,837 | B2 | * | 5/2007 | Clarke et al. | 280/731 |
| 7,347,450 | B2 | * | 3/2008 | Williams et al. | 280/739 |
| 2003/0189327 | A1 | * | 10/2003 | Burdock et al. | 280/743.2 |
| 2004/0155438 | A1 | * | 8/2004 | Hawthorn et al. | 280/728.2 |
| 2004/0195808 | A1 | * | 10/2004 | Amamori | 280/728.2 |
| 2006/0071461 | A1 | * | 4/2006 | Williams et al. | 280/739 |

* cited by examiner

*Primary Examiner*—Paul N Dickson
*Assistant Examiner*—Robert A Coker
(74) *Attorney, Agent, or Firm*—Foley & Lardner LLP (57) ABSTRACT

An airbag module includes an airbag, an inflator for inflating the airbag, a mounting plate, and a non-rigid tension element. The tension element comprises at least one fabric layer. The tension element is attached to the mounting plate to restrict lateral movement of the airbag during deployment. The airbag module may also include a fabric casing with a bowl section and a draw section. The fabric casing includes a casing opening and a tether drawstring. The tension element may be attached to the fabric casing.

10 Claims, 13 Drawing Sheets

AIRBAG MODULE

CROSS-REFERENCE TO RELATED PATENT APPLICATIONS

This application claims priority to U.S. Provisional Application No. 60/851,288 filed Oct. 13, 2006, which is incorporated herein by reference in its entirety.

BACKGROUND

The present invention relates generally to the field of airbag modules. More specifically, the present invention relates to the field of airbag modules that include tension elements and fabric housings.

SUMMARY

One embodiment relates to an airbag module that includes an airbag, a housing, and an inflator for inflating the airbag. The housing includes a mounting plate and a tension element attachable to the mounting plate. The tension element includes at least one layer of fabric. The inflator is attachable to the mounting plate Another embodiment relates to an airbag module that includes an airbag, a housing, and an inflator for inflating the airbag. The housing includes a mounting plate and a tension element separate from the mounting plate and integral to the airbag or airbag casing. The tension element includes at least one layer of fabric.

Yet another embodiment relates to an airbag module that includes an airbag, a housing, and inflator for inflating the airbag. The housing includes a mounting plate, a tension element, and a fabric casing with a bowl section and a draw section with a casing opening and a tether drawstring. The inflator is attachable to the mounting plate.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

An airbag module, according to embodiments, generally comprises an airbag, a housing, and an inflator. The housing further includes a tension element structure that restricts the deployment direction of the airbag, a casing that envelops the airbag or cushion, and a mounting plate that connects the rest of the module to the place vehicle component. The inflator may optionally contain a flange to help manipulate the inflation direction of the airbag. The soft fabric casing has an opening for the airbag to deploy through. The airbag module is generally positioned in the vehicle such that an airbag module cover encloses or covers the module. The cover (not shown) will break open upon deployment of the airbag such that the airbag can deploy into a vehicle occupant compartment to protect a vehicle occupant.

The airbag module may be located in any vehicle compartment that is suitable for protecting a vehicle occupant. These vehicle compartments include, for example, a driver's steering wheel, below the steering wheel to protect the driver's knees, in the passenger side's dash, the front doors of the driver and passenger sides, the perimeters of the driver and passenger seats, in the roof in front of both the driver and passenger, the perimeters of the rear passenger seats, and the sides of the rear doors.

Figure 1:
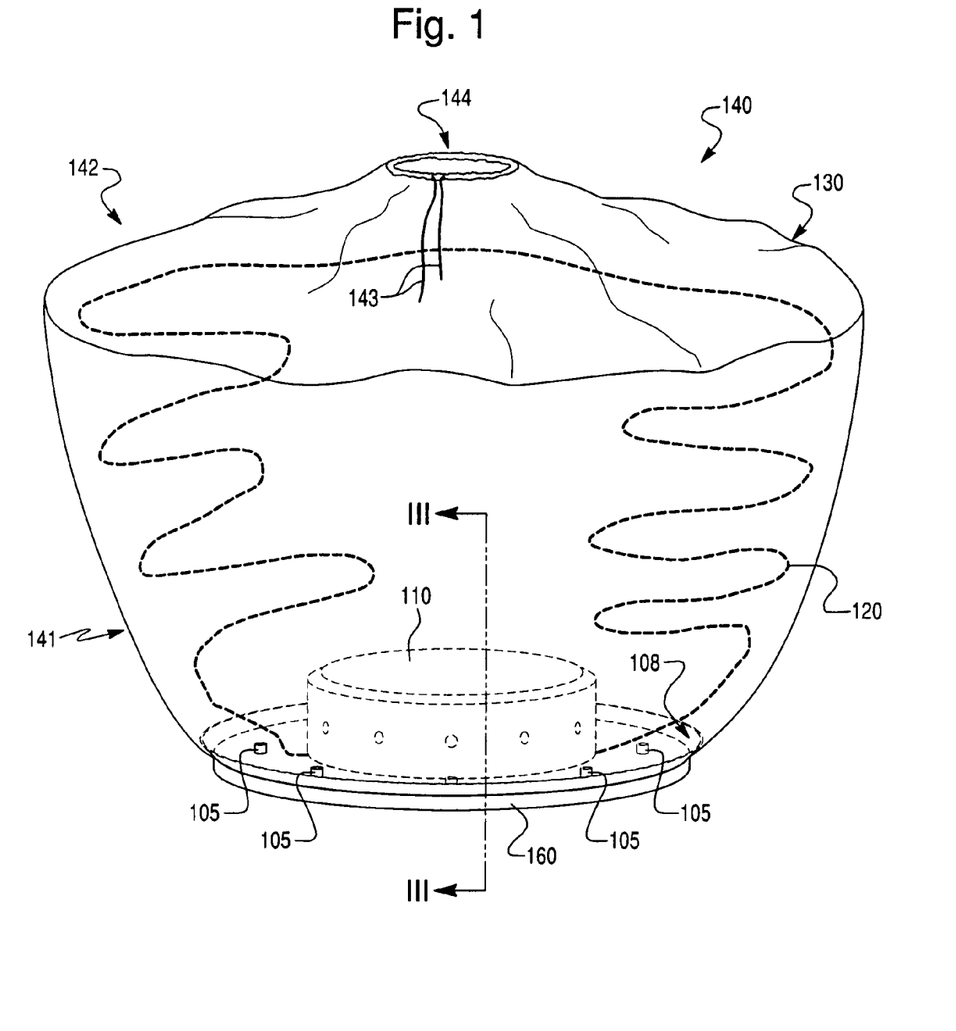
FIG. 1 is a front view of an airbag module with a fabric casing according to an embodiment.
Figure 2:
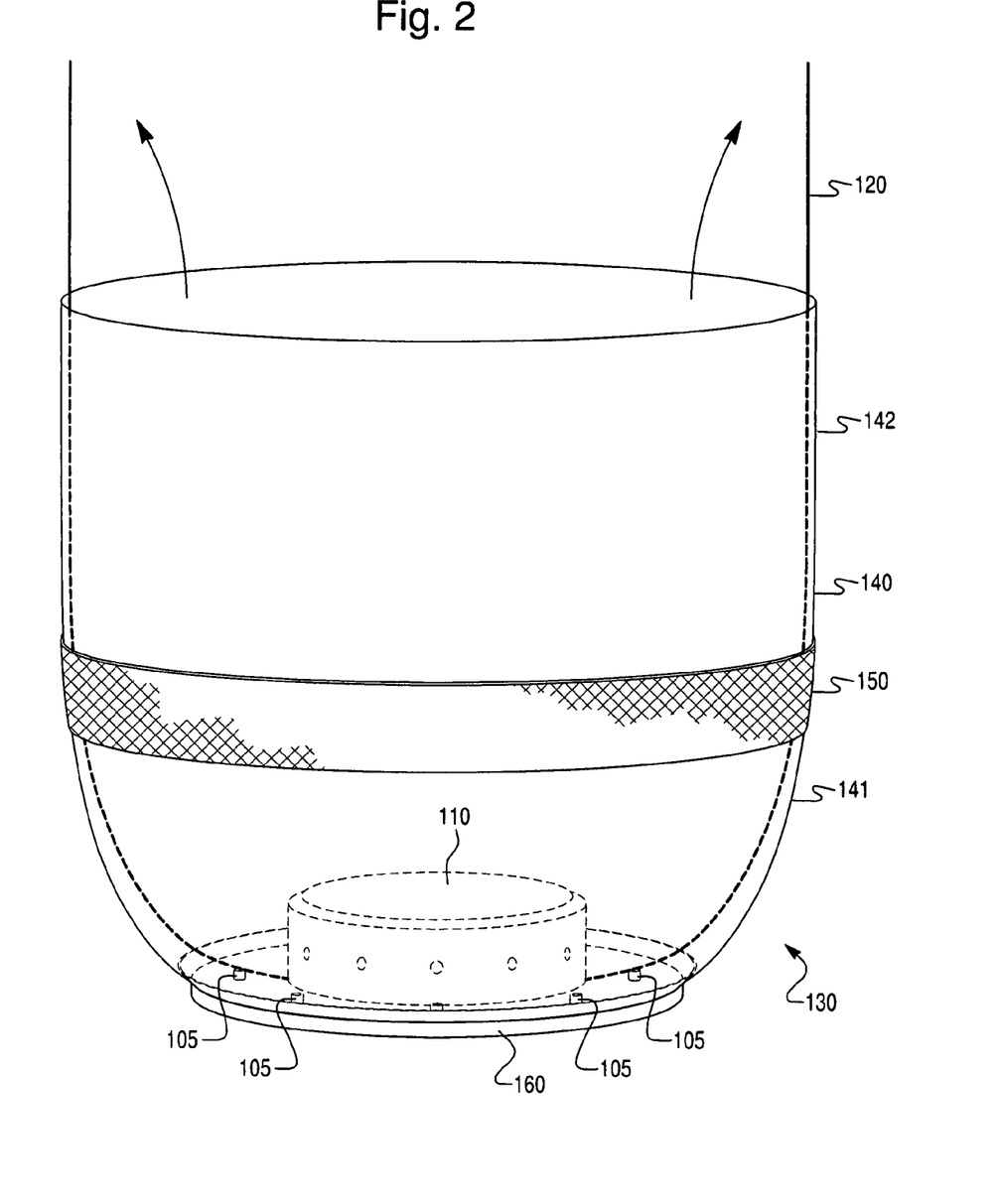
FIG. 2 is a front view of the airbag module of FIG. 1 in which the airbag has deployed and the fabric casing includes a tension element.

Referring to FIGS. 1 and 2, one embodiment of the airbag module comprises an airbag 120, an inflator 110 for inflating the airbag 120, a housing 130 that includes a soft fabric casing 140 for the airbag 120, a tension element 150, and a mounting plate 160. FIG. 1 illustrates the airbag module as it would be stored in a vehicle prior to deployment of the airbag 120. In FIG. 1, a single layer of fabric casing 140 is used as a tension element. FIG. 2 illustrates the airbag 120 during deployment. In FIG. 2, a tension element 150 is used, that includes control belt made of at least one fabric layer, in addition to the single layer of fabric casing 140.

The airbag 120 can be made of woven nylon fibers or any other material that is soft, durable, and elastic. Generally, an airbag is pre-folded in a conventional airbag module. The embodiments do not require the airbag 120 to be pre-folded. The airbag 120 may be compression folded in a manner commonly referred to as "Petri" or "Skrunch" folding. The airbag 120 may be folded in any other suitable manner.

The inflator 110, as embodied in FIGS. 1 and 2, is a circular or oval shaped disc. The inflator 110 may be mounted to a simple stamped or molded mounting plate 160, directly to an instrument panel bracket, or to any other suitable vehicle component.

The fabric casing 140 (also commonly referred to as a "bag" or "cover") primarily comprises two sections: a bowl section 141 and a draw section 142 with an opening 144. The bowl section 141 is the section of the fabric casing 140 that circumscribes the airbag 120 from the mounting plate 160 on the bottom to the top end of the airbag, but without covering this top end. The top end is the end furthest from the inflator along the axis of the airbag deployment trajectory perpendicular to the length of the inflator. The draw section 142 comprises the fabric casing 140 that covers the top end of the airbag 120 and includes the opening 144. The fabric casing 140 comprises nylon, polyester, rubber, or any other suitable material that is durable and elastic. The airbag module user may adjust the positioning of the airbag 120 inside the fabric casing 140 through the opening 144 in the draw section 142. Ways to design the opening 144 include an adhesive patch and a cut fabric yield section.

A bowl section 141, comprising a tension element 150 (such as shown in FIG. 2) or an integral tension mechanism (as shown in FIG. 1), controls the lateral enlargement mouth of the airbag module in the initial expansion of the deploying airbag 120. The tension element 150 restricts the lateral swelling of the inflating airbag 120 so that the deploying airbag 120 is directed at the opening 144, without allowing for too much lateral expansion that would excessively load and rip the sides of the fabric casing 144. As embodied in FIG. 1, the single layer of fabric that comprises the bowl section 141 of the fabric casing 140 also comprises a tension element. To strengthen the tension element beyond the single layer of fabric comprising the fabric casing 140, multiple layers of the fabric casing 140 in the bowl section 141 may be folded in on itself and attached together so that there is an inside radius of zero or near zero between fabric layers. In any embodiment, the tension element 150 may have an inverted conical shape to help maintain its restraining shape during the initial few milliseconds of airbag 120 deployment.

Additional layers of fabric may be added to the bowl section 141 in a way other than the folding method described above if further restriction of the lateral swelling of the deploying airbag 120 is needed. The tension element 150 is shown in one version of the first embodiment in FIG. 2 as including additional layers of narrow, fabric bands that form a control belt with extensions (not shown) running to the inflator mounting 160 as needed to locally reinforce critical areas of the fabric casing 140. The tension element 150 may be tacked, sewn, or otherwise attached onto the fabric casing 140. The tension element 150 control belt comprises at least one layer of airbag fabric or fabric reinforcing material, or any other suitable material, that is sewn or otherwise attached to the bowl section 141. One suggested fabric to be used in the tension element 150 is the polyester material used with seat belts.

The draw section 142, as shown in FIG. 1, comprises a frangible drawstring tether 143 that controls the opening and closing of the housing cover 140. One end of the drawstring tether 143 is attached to an appropriate tether point on a portion of the fabric casing 140 or other suitable portions of the airbag module. The opposite end of the drawstring tether 143 may be drawn around the periphery of the opening 144. The fabric around the periphery of the opening 144 may be folded over itself and stitched to form a substantially tube shape for the tether 143.

During deployment, as shown in FIG. 2, the tether 143 yields (breaks) under the pressure from the deploying airbag 120, allowing the deploying airbag 120 to pass through the opening 144 in the soft housing cover 140 and toward the designated deployment opening in an instrument panel or steering wheel, or other vehicle component. The top end of the airbag 120 ultimately breaks the tether 143 to widen the opening 144 in the fabric casing 140 for the airbag 120 to pass through. The tension element 150, shown with a control belt in FIG. 2, restricts the deployment direction of the airbag 120 so that the airbag 120 does not deploy laterally before passing through the opening 144. This draw section 142, although shown in FIGS. 1 and 2 as being on axis with a center line of the inflator 110, can be offset to one side or another to facilitate a particular application.

The mounting plate 160 for the inflator 110 may be formed of steel, plastic or any other suitable material. The mounting plate 160 is a substantially flat and rigid plate on which the inflator 110 is mounted via studs 105. The mounting plate 160 attaches directly to a vehicle body component, such as an instrument panel. The mounting plate 160, as embodied in FIGS. 1 and 2, includes a flange 108. The flange is upturned, facing the opening 144 in the fabric casing 140, and impinges and directs the gas from the inflator to improve the direction of the deploying airbag 120.

Figure 3:
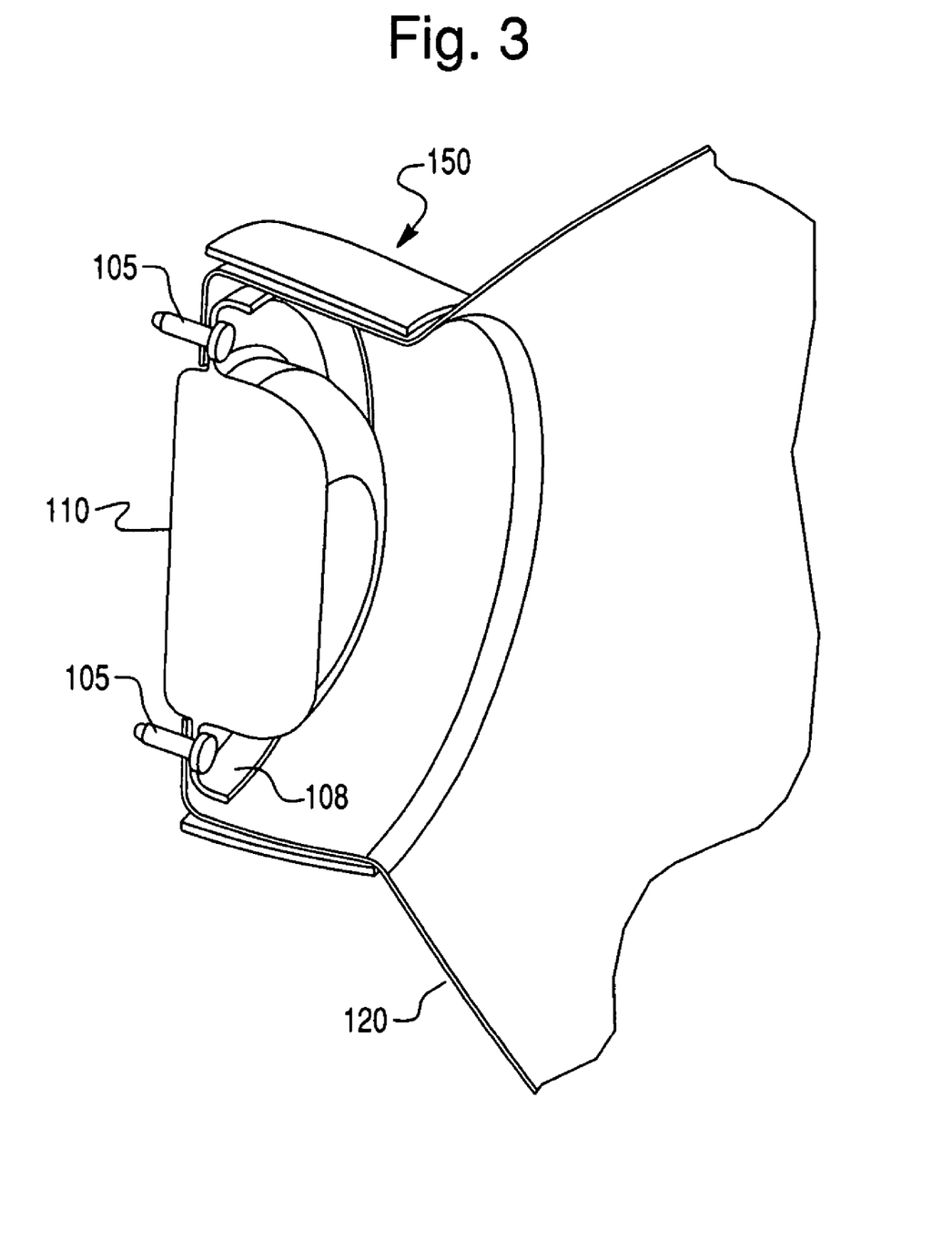
FIG. 3 is a cross-sectional view of the airbag module taken along line III-III in FIG. 1.
Figure 4:
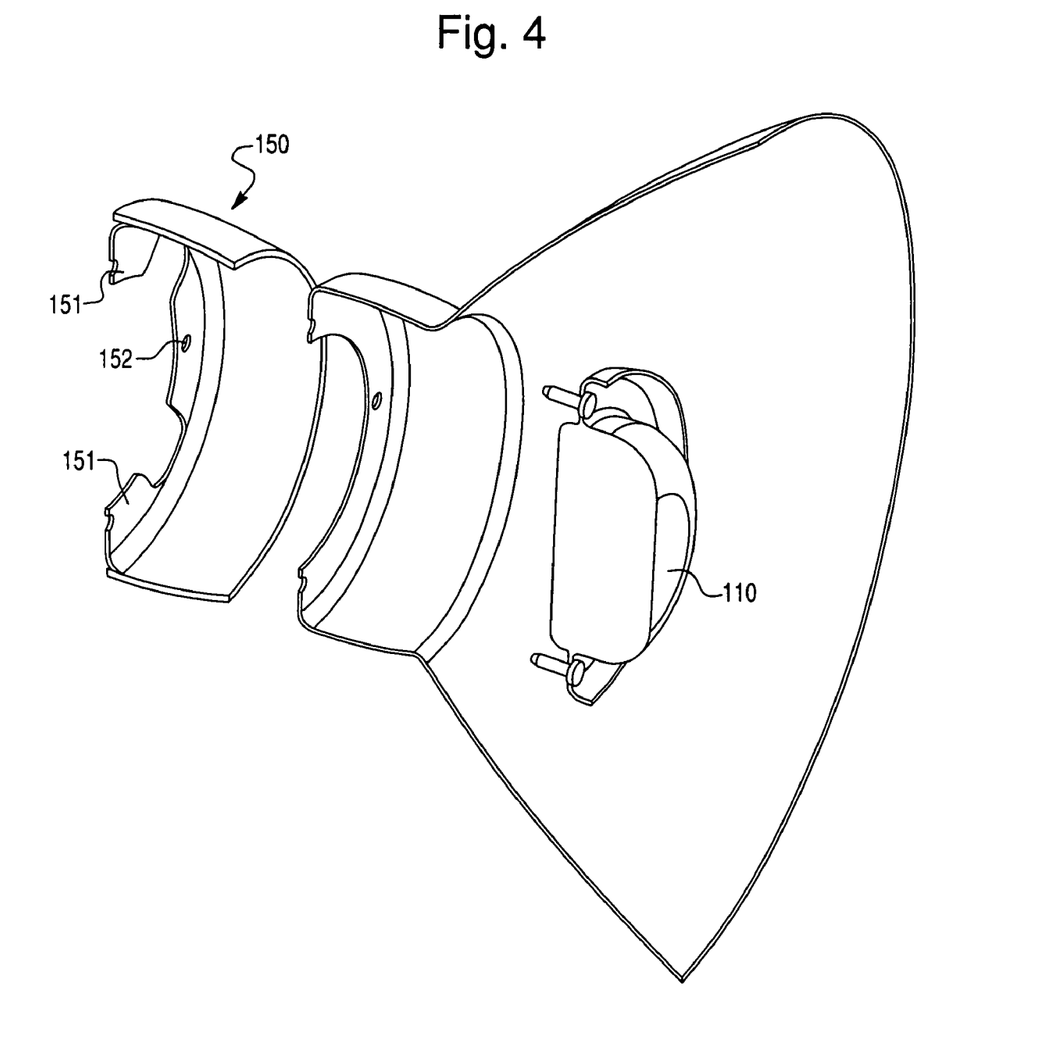
FIG. 4 is an exploded view of the airbag module as shown in FIG. 3.

FIG. 3 is a cross-section of the embodiment shown in FIGS. 1 and 2. FIG. 4 is a cross-section of the disassembled embodiment shown in FIGS. 1 and 2. The tension element 150, as shown in both FIGS. 3 and 4, includes a control belt separate from the fabric casing 140 that restricts the lateral movement of the airbag 120 during deployment. The control belt of the tension element 150 in FIGS. 3 and 4 also includes flat tabs 151 that are attached to the bottom of the control belt 150 closest to the mounting plate 160 and extend out towards the inflator 110. The tabs 151 have holes 152 that allow studs 105 to pass through the tabs 151 and fasten the tension belt 150 to the mounting plate 160. The fabric casing 140 includes similar tab extensions that use studs 105 to fasten the fabric casing 140 to the mounting plate 160.

Figure 5:
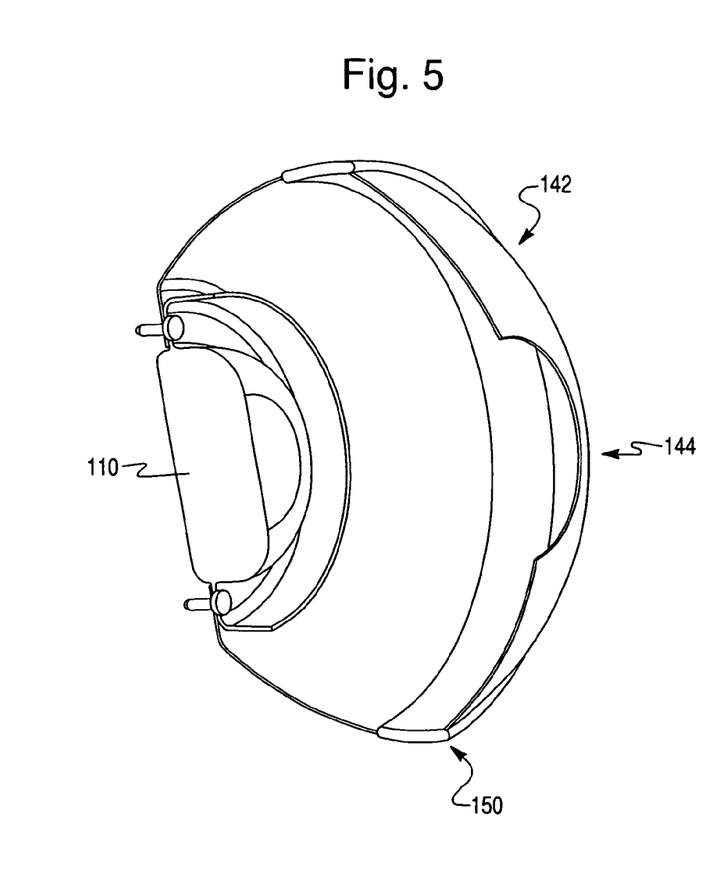
FIG. 5 is a cross-sectional view of the airbag module of FIG. 1 with a tension element.
Figure 6:
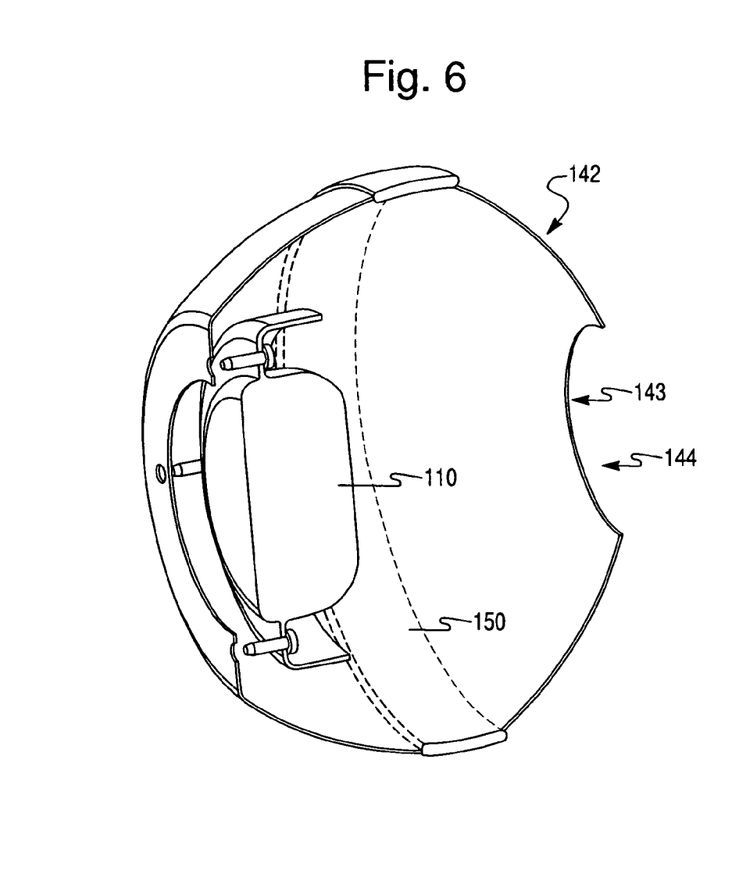
FIG. 6 is another cross-section view of the airbag module of FIG. 1 with a tension element.

FIGS. 5 and 6 are further depictions of the embodiment shown in FIGS. 1 and 2. FIG. 5 is a view of a cross-section of the assembled module from an angle from above that focuses on the bottom of the module. FIG. 6 is a view of a cross-section of the assembled module from an angle from the bottom that focuses on the top of the module. The inflator 110 is a circular disc-shape. The inflator 110 mounts to a simple stamped or molded mounting plate 160. The inflator 110 may also directly attach to an instrument panel bracket. The tension element 150 includes a control belt that is made of several layers of airbag fabric or fabric reinforcing material. These layers are attaches to the fabric casing 140. The draw section 142 includes a draw tether 143 around the periphery of the opening 144.

Figure 7:
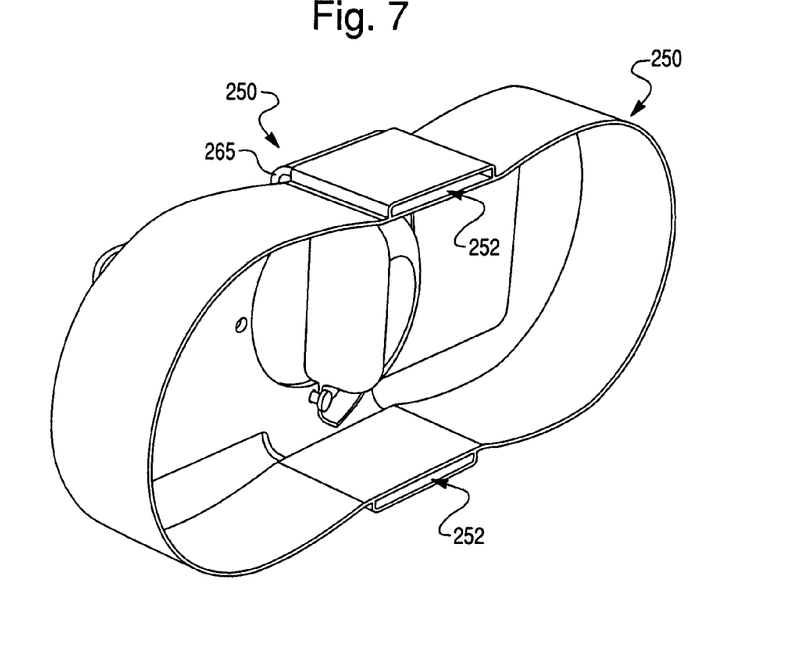
FIG. 7 is a perspective view of a tension element and mounting plate of an airbag module according to another embodiment.
Figure 8:
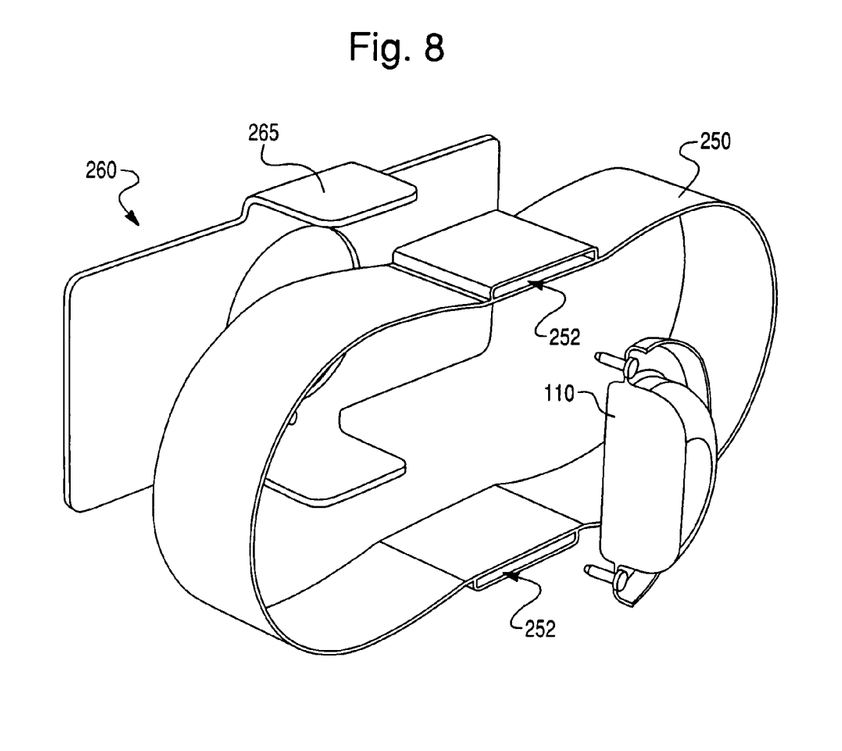
FIG. 8 is an exploded view of the airbag module of FIG. 7.
Figure 9:
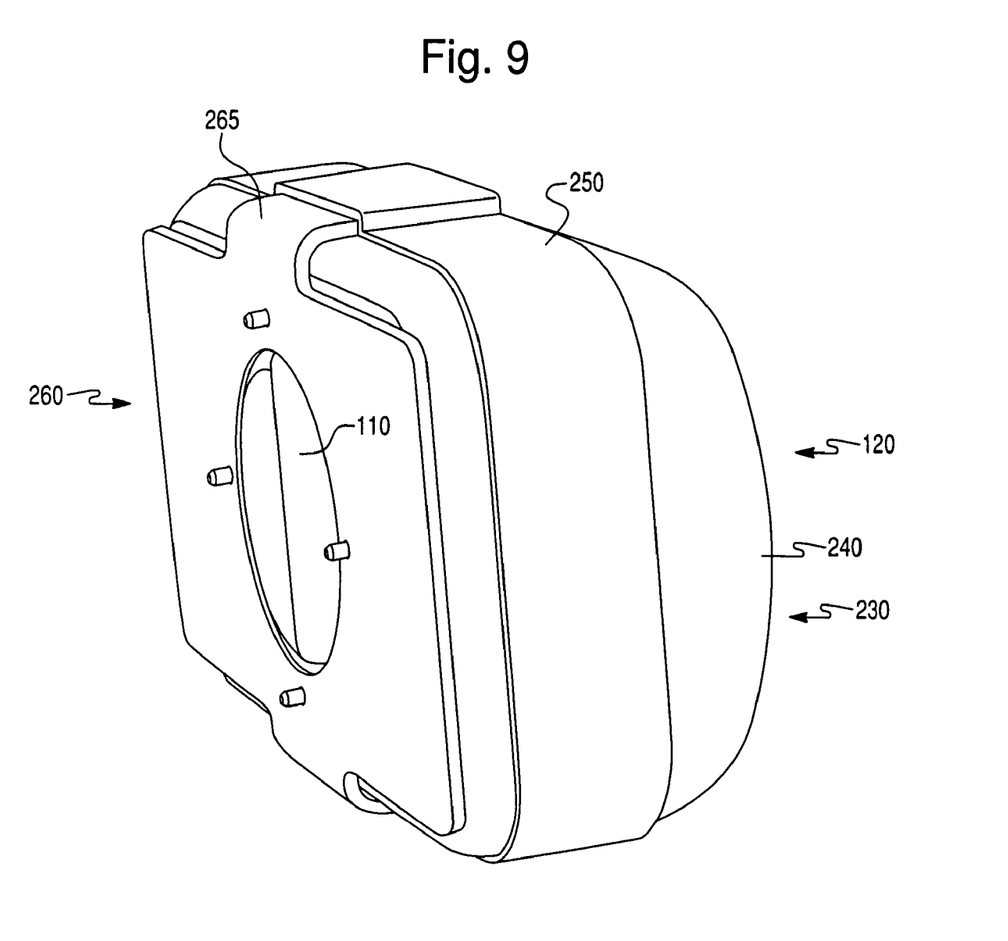
FIG. 9 is a perspective view of the airbag module of FIG. 7.
Figure 10:
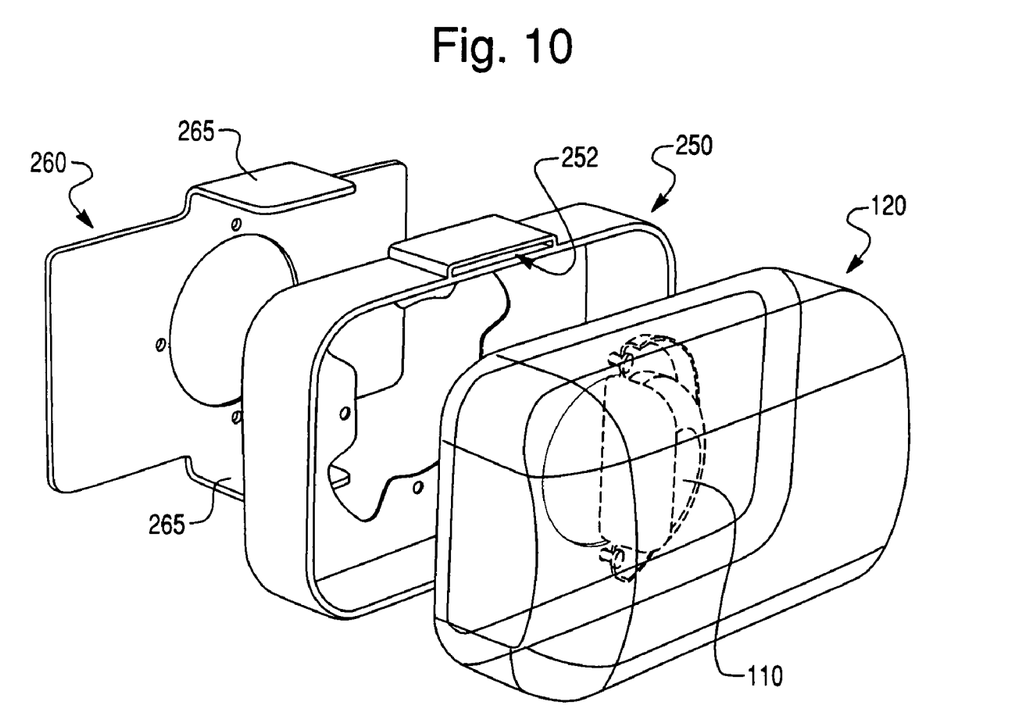
FIG. 10 is an exploded view of the airbag module of FIG. 9.

According to a second embodiment, shown in FIGS. 7-10, an airbag module comprises an airbag 120 (FIGS. 9-10), an inflator 110 (FIGS. 7-8) for inflating the airbag 120, a housing 230 that includes a fabric casing 240 for the airbag 120, a tension element 250, and a mounting plate 260 with tabs 265. The tension element 250 comprises a control belt that is generally rectangular in shape. The tension element 250 is attachable to the mounting plate 2160. The attachable tension element 250 may be integral with the mounting plate 260 or attach directly or indirectly to the mounting plate 260. The tension element 250 may be in any shape as long as the tension element 250 surrounds the perimeter of the airbag 120. FIG. 7 shows the assembled airbag module and FIG. 8 shows the airbag module disassembled. FIGS. 9-10 illustrates the airbag 120 and fabric casing 140. FIG. 9 shows the airbag module with components fully assembled. FIG. 10 shows the airbag module with the components disassembled.

As sown in FIGS. 7 and 8, loops or openings in the tension element 250 attach to tabs 265 that are integral or connected (directly or indirectly) to the mounting plate 260. The mounting plate 260 includes two tabs 265 opposite each other. Any suitable number or configuration or shape of the tabs 265 may be used. The tension element 250 includes corresponding openings 252 which hook or attach to the tabs 265 to locate the airbag 120 onto the mounting plate 260. The tabs 265 may be anti-crush (rigid) tabs.

The discussion for the first embodiment regarding the inflator 110, mounting plate 160, soft-casing 140, bowl section 141, draw section 142, opening 144, drawstring tether 143, and studs 105 may be applicable for other embodiments as well.

Figure 11:
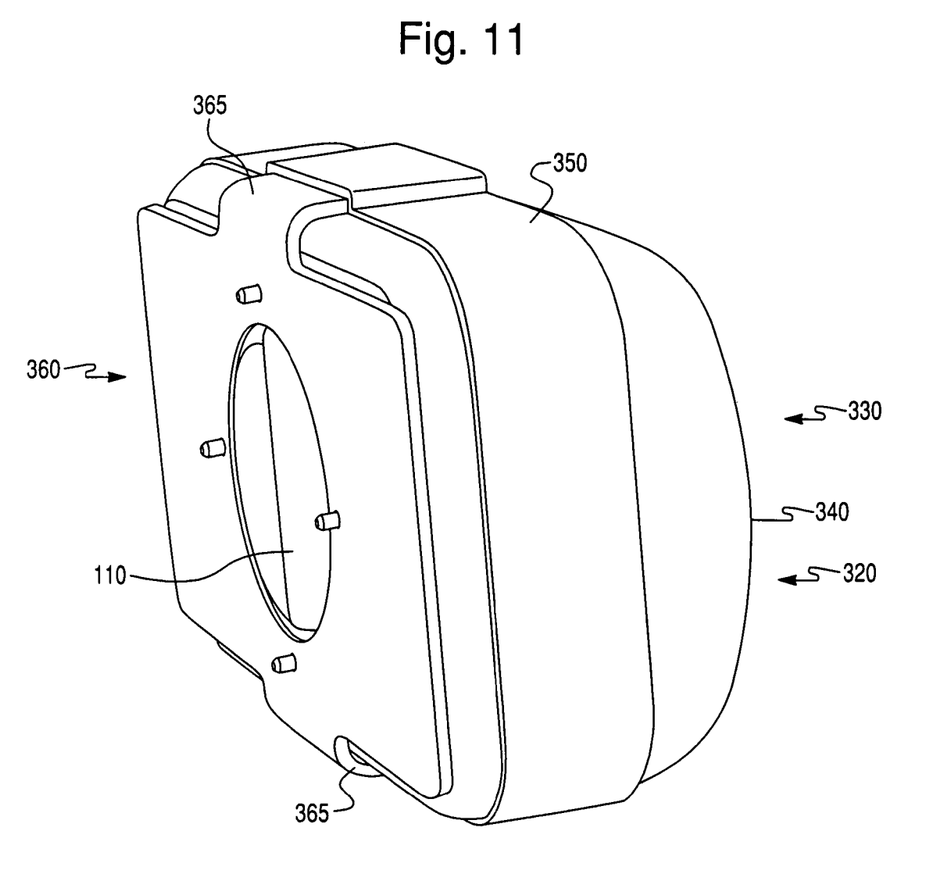
FIG. 11 is a perspective view of an airbag module according to another embodiment.
Figure 12:
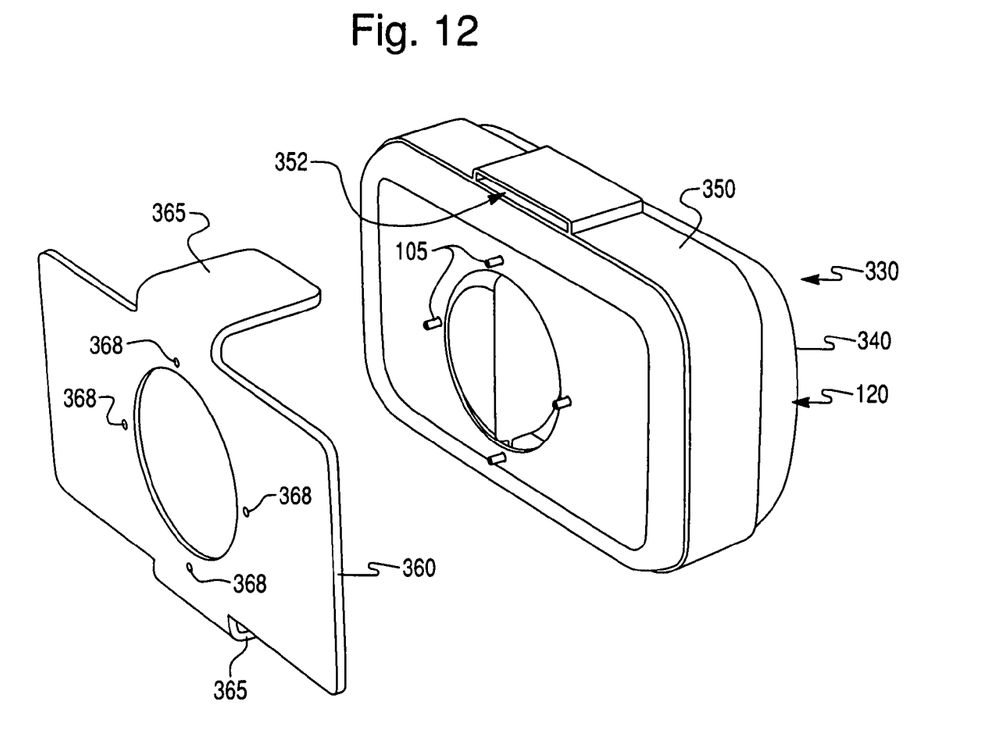
FIG. 12 is an exploded view of the airbag module of FIG. 11.

According to a third embodiment, as depicted in FIGS. 11-12, the airbag module comprises an airbag 120, an inflator 110 for inflating the airbag 120, a housing 330 that includes a fabric casing 340 for the airbag 120, a tension element 350, and a mounting plate 360 with tabs 365. FIG. 11 shows the airbag module assembled. FIG. 12 shows the airbag module partly disassembled.

The tension element 350 is integral to the airbag 120. The tension element 350 includes several layers of fabric shaped into a restricting band. The tension element 350 may be sewn onto or otherwise attached to the airbag 120 so that tension element 350 may not be easily separable. The tension element 350 includes tab loops 352 so that the tension element 350 may be attached to the mounting plate 360 on the mounting plate tabs 365 when the airbag 120 with tension element 350 is inserted into the mounting plate 360.

The inflator 110, as shown in FIG. 12, attaches to the mounting plate 360 through studs 105 that fasten through holes 368 in the mounting plate 360. The inflator 110 may separately attach to the mounting plate 360 or be integral with the airbag 120.

Figure 13:
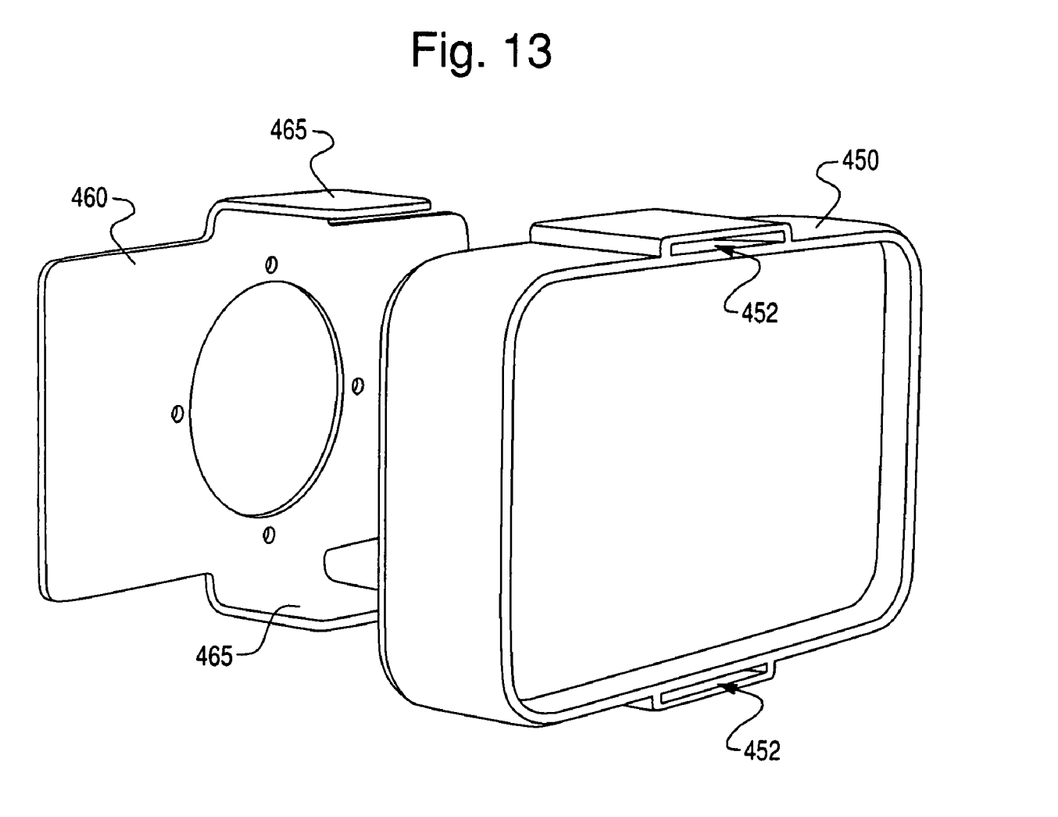
FIG. 13 is an exploded view of a mounting plate and tension element of an airbag module according to another embodiment.
Figure 14:
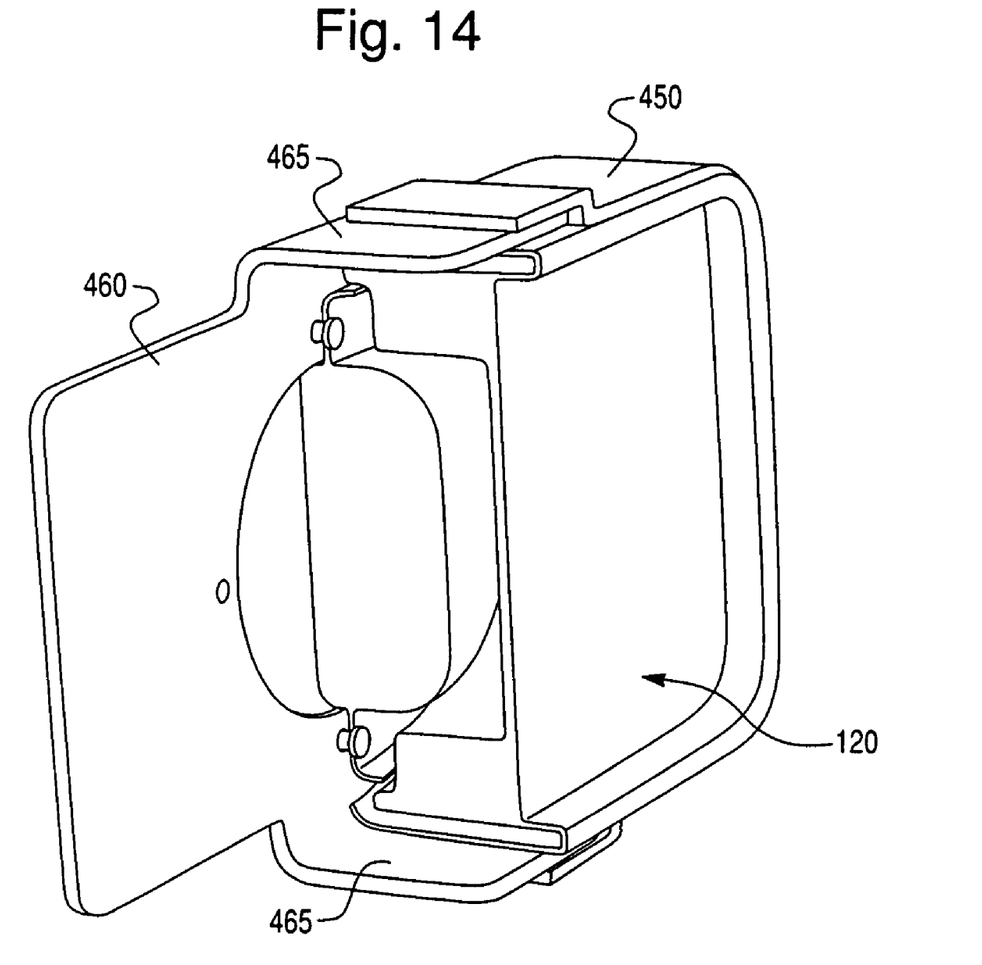
FIG. 14 is a cross-sectional view of the airbag module of FIG. 13.
Figure 15:
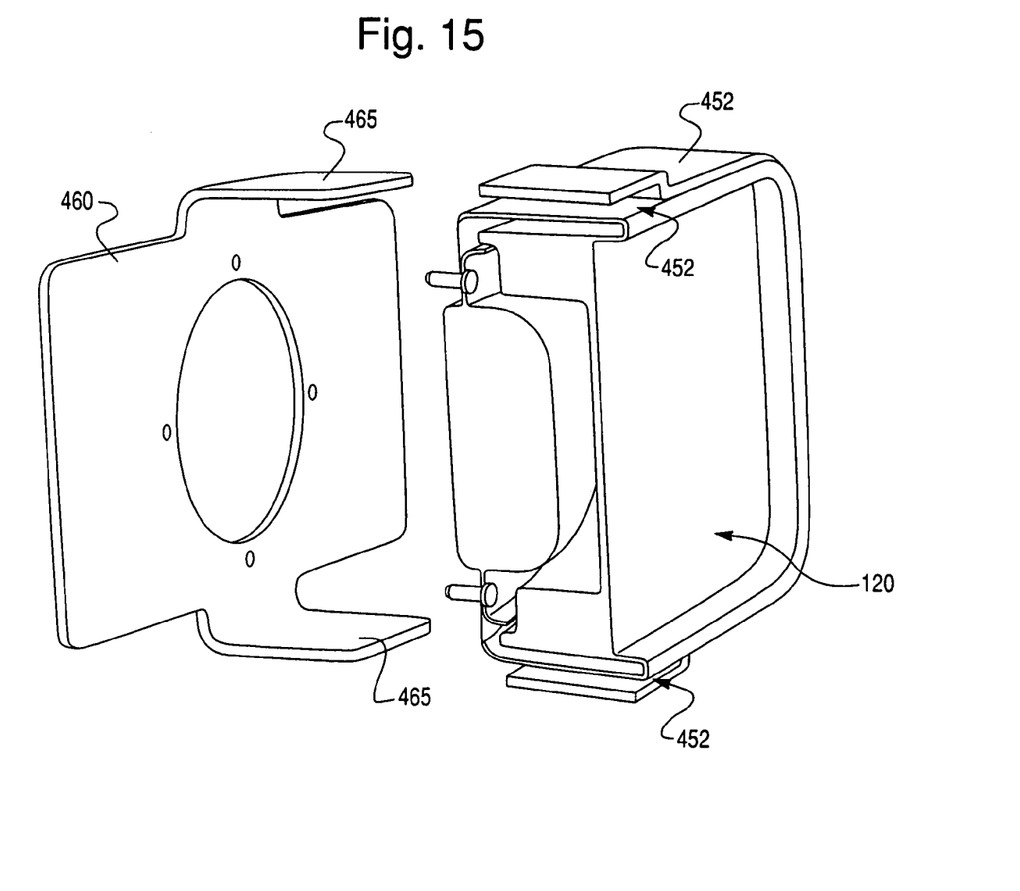
FIG. 15 is an exploded view of the module of FIG. 14.

FIGS. 13-15 show a further embodiment of an airbag module. This embodiment is similar to the embodiment of FIGS. 11-12. The airbag 120 is vacuum packed to compress the airbag 120 so that the airbag 120 is completely encapsulated within the height of the tension element 450. FIG. 13 shows the mounting plate 460 separate from the rest of the airbag module. FIG. 14 shows the airbag module fully assembled, but with a cross section that cuts through the airbag module except for the mounting plate 460. FIG. 15 shows the same cross-section of FIG. 14, but with the mounting plate 460 separated from the rest of the airbag module. The mounting plate 460 includes tabs 460 that can be inserted into tab loops or openings 452 in the tension element 450.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module, comprising:
   an airbag;
   a casing to cover the airbag;
   a housing including:
      a mounting plate; and
      a tension element separate from the mounting plate and integral to the airbag or airbag casing, wherein the tension element includes at least one layer of fabric; and
   an inflator for inflating the airbag,
   wherein the tension element is sewn onto the casing.

2. An airbag module, comprising:
   an airbag;
   a housing including:
      a mounting plate;
      a tension element; and
      a fabric casing with a bowl section and a draw section with a casing opening and a drawstring tether; and
   an inflator for inflating the airbag attachable to the mounting plate.

3. The airbag module of claim 2, wherein the bowl section is made of at least one of polyester, nylon, and rubber.

4. The airbag module of claim 2, wherein the bowl section further includes a tension element comprising of at least one of polyester, nylon, and rubber.

5. The airbag module of claim 4, wherein the tension element is sewn together with the bowl section.

6. The airbag module of claim 2, wherein the bowl section is an inverted conical shape to restrict lateral movement of the airbag during deployment.

7. The airbag module of claim 2, wherein the mounting plate is steel or plastic.

8. The airbag module of claim 2, wherein the inflator is attached to the mounting plate with studs.

9. The airbag module of claim 2, wherein a center of the casing opening is located at a point furthest from the inflator along a directional axis of airbag deployment.

10. The airbag module of claim 2, wherein the drawstring tether is attached to and encircles the casing along a perimeter of the casing opening.

* * * * *